April 6, 1971     J. C. BLEE     3,574,015
METHOD AND APPARATUS FOR JOINING CONDUCTORS
Filed May 8, 1967
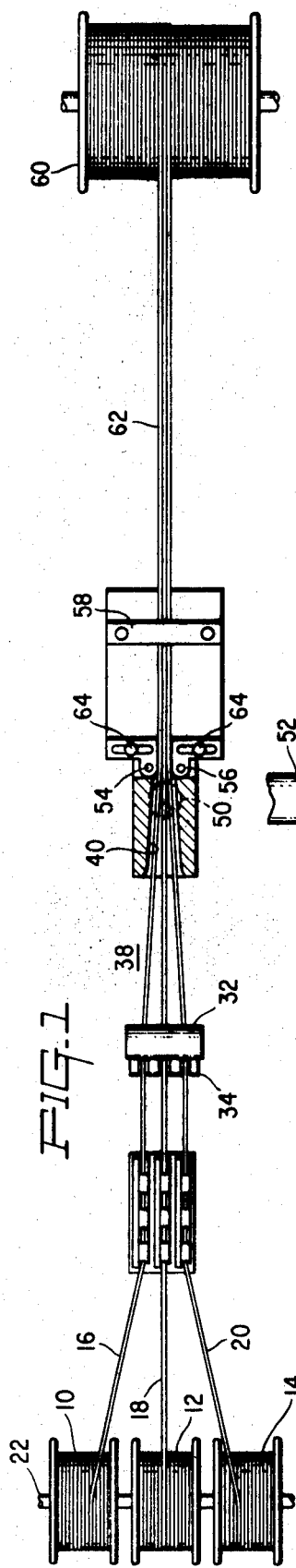
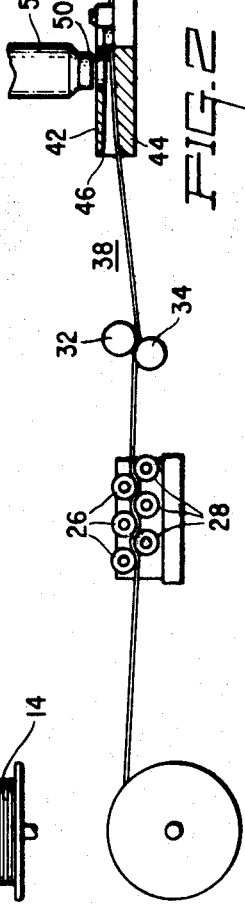
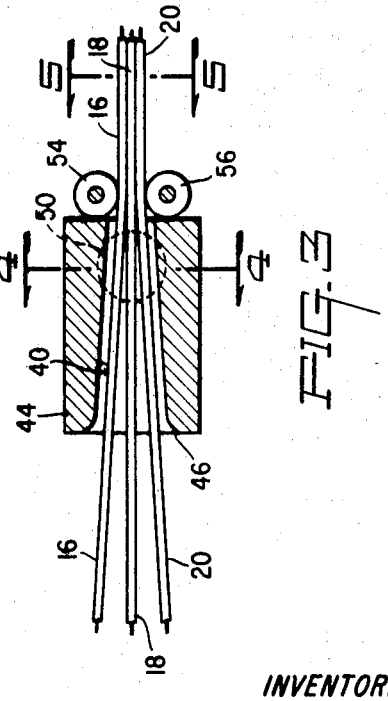
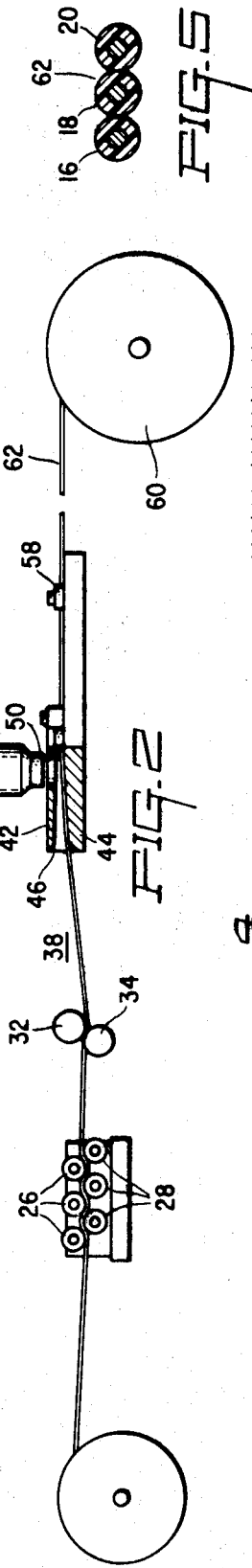
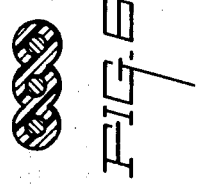
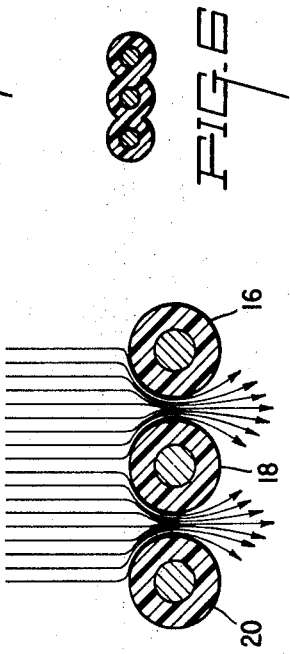
INVENTOR.
JAMES C. BLEE
BY
*Jeffers and Young*
ATTORNEYS

United States Patent Office 3,574,015
Patented Apr. 6, 1971

3,574,015
METHOD AND APPARATUS FOR JOINING CONDUCTORS
James Clark Blee, R.R. 9, 8687 Notestine Road, Fort Wayne, Ind. 46805
Filed May 8, 1967, Ser. No. 636,989
Int. Cl. H01b 13/00
U.S. Cl. 156—47                                    9 Claims

ABSTRACT OF THE DISCLOSURE

A plurality of resin bonded conductors are passed continuously from supply reels into converging paths after passing through straighteners and devices which are used for aligning the conductors into a single plane. After the conductors have converged by a predetermined amount, a hot air blast is directed transversely to the conductors and between the gaps provided between adjacent conductors. The surfaces of the conductors which confront each other are subjected to localized intense heating and before the surfaces can cool, they are brought into light contact with each other so that there is a tangential weld bonding between the conductors, forming a continuous, welded seam which holds the conductors together in the form of a cable. None of the insulation is removed from the imbedded conductor material, nor is the insulation distorted.

---

This invention relates to the method and apparatus for joining resin coated conductors to form cables used in the manufacture of electrical harnesses or the like.

BACKGROUND OF THE INVENTION

In the manufacture of multiconductor cable or the like, it has been the practice to heat the resin material which forms the outer insulation cover for the conductor and then while the resin insulation is still tacky and weldable, the conductors are subsequently brought together, thereby fusing the contacting surfaces of adjacent conductors. Several proposals have been made for effecting this heating. For example: conductors have been passed continuously through a heating tunnel or the like, and the entirety of the conductor heated before the joining operation; in another proposal, the conductors are caused to pass over heated shoes or other heated surfaces to generate heat at the surface of the conductor prior to its joining with other conductors; in a still further method the use of solvents is resorted to, for tackifying the surfaces of the conductors which are then welded by first solvating the resin and then heating to fuse the welded surfaces together. The heated shoe concept is based on the idea of producing a localized heating of the conductor in the vicinity where the weld is to be accomplished.

The shortcoming of these described procedures is that for the most part, they are not adapted to weld conductors having only a very thin coating of resin insulation because the resin insulation tends to be rubbed off or distorted as it flows past a heated surface. With respect to heating the entire conductor by passing it through heating tunnels or the like, this procedure has proved unsatisfactory because it is expensive and difficult to control and, the insulation tends to become distorted when the conductors are brought together to effect the weld, because of handling difficulties which are involved when the entirety of the conductor is heated.

What is needed as an improvement over these prior procedures, is a faster method of manufacture and one which is adapted for producing a bonding together of a plurality of conductors in a high speed and reliable manner.

Also, it is desired to obtain a new and improved process for forming multiconductor cables which is adapted not only for relatively thick (or heavy) layers of insulation but also is adapted for relatively thin coatings of insulation, which tend to be removed from the metal core conductor when the heated conductor comes into contact with an opposing surface. The present invention is equally adapted for forming multiple conductor cables having thin layers of insulation or thick layers of insulation. Moreover, the present invention proposes an increased rate of production of product and one which can be more precisely controleld by confining the heating areas to those sections of insulation which are tangentially bonded.

Other objects and features of the present invention will become apparent from a consideration of the following description which proceeds with reference to the accompanying drawings wherein:

DESCRIPTION OF DRAWINGS

FIG. 1 is a top view of the apparatus which is used for forming the cable and embodies the various features of the process of this invention;

FIG. 2 is a front elevation view of the apparatus shown in FIG. 1;

FIG. 3 is an enlarged detail view of that portion of the apparatus in which the conductors are converged for heating at their tangential surfaces by a hot air blast and then tangentially bonded;

FIG. 4 illustrates schematically the air flow as it passes between the gaps of the conductors, the view being shown much enlarged to illustrate the principle involved in the localized heating of selected areas of the conductors;

FIG. 5 is a cross sectional view of the bonded conductors forming the tape; and

FIG. 6 illustrates the conductors bonded together in the manner taught by the prior art and illustrating objectional distortions of the conductors.

DESCRIPTION OF SPECIFIC EXAMPLE EMBODIMENTS

Referring now to the drawings, there is shown a plurality of supply reels 10, 12 and 14, from which are drawn continuous lengths of conductors 16, 18 and 20. The conductors may be either the same size or of different size, depending upon the characteristics and design of the finished product. Each conductor consists of a central core of electrically conductive metal, such as copper or the like, and an outer layer of resin composition insulation. The resin can be polyvinyl chloride, polyvinyl acetate, etc. or other suitable composition, the only requirement being that it be weldable under heat and pressure with the resin compositions of the other conductors. The supply reels may be mounted on a common axle 22 in order that each will turn synchronously thereby providing conductors at the same rate.

After leaving the supply reels, the wires are passed through a plurality of straightening rolls 26 and 28, these rolls being disposed in opposed banks, so at the time the conductors leave the straightening rolls, they are substantially rectilinear and can be aligned in edgewise contact throughout their length. The three conductors are then passed between locating rolls 32, 34, which dispose the three conductors in a coplanar relation to each other. Thus, in the vicinity indicated by reference numeral 38 (FIGS. 1 and 2) the conductors are in straightened condition and are coplanar.

The conductors are then passed in a converging relation into a chamber 40 having upper wall 42 and lower wall 44 with an entrance orifice 46, said chamber 40 being tapered longitudinally (FIG. 1) and inclined (FIG.

2) in order to offer minimum resistance to longitudinal movement of the conductors as they pass progressively through the chamber and closer together.

The upper member 42 has an aperture 50 through which is directed a jet of hot gases, as for example, air, the jet of air being developed from a heater 52 with a resistor or gas fired heating element therein. The jet of air (FIG. 4) encompasses the entire width of the combined cross sectional diameters of said conductors, and the flow concentrates at the points of tangency of the respective conductors. The described heated air flow is directed transversely to the direction of movement of the conductors and it then moves through the slight gaps between the adjacent conductors (FIG. 4). The flow of air tends to intensify within the gap portion, imparting a localized greater heating effect in those vicinities of the conductor which are traversed to a greater extent by the flow of air. After the adjacent opposed sections of the conductors are heated by the hot air blast, as indicated in FIG. 4, the conductors are then brought together by spacers 54, 56 which are spaced apart by an amount which is approximately equal to the combined diametral dimensions of the three conductors. Thus, the light tangential contact of the heated sections of adjacent conductors produces a continuous weld connection between such conductors and this close contact occurs immediately succeeding the exposure of the tangential section to the intensity of the heat produced by the hot air blast so that the conductors do not have an opportunity to cool before coming into contact.

Thus, there is formed a continuous tangential bond between adjoining conductors, but the light engagement produced between the adjoining conductors, as they are joined, is such that no deformation will occur of the conductors. For example, referring to FIG. 6, in previous methods for welding the conductors together there was an appreciable distortion of the individual conductors thus increasing the likelihood of stripping away some of the insulation layer and also producing blistering, runoff and irregularities in the surface of the cable.

After the conductors are joined together, they pass along surface 56 and then through an opening in the hold down bar 58 which produces a leveling effect on the surface of the cable, the cable being then wound onto a windup drum 60.

The tape is manufactured continuously and the conductors are drawn through the apparatus to form a continuous strand of tape by a suitable motor drive (not shown) which is operable through the windup drum 60 or some suitable intermediate point, as for example along the length of the cable 62.

The apparatus is adjustable to provide for different dimensions and numbers of conductors by simply loosening the hold down screws 64 of spacer bars 54, 56, and moving the two members farther apart or closer together, as the case may be. Also, the dimension between the leveling members 32, 34, and chamber 42 can be varied in order to establish the preferred rate of convergence of the conductors. In any event, the rate of convergence is such that the slight gap between the conductors at the point where the hot air blast is directed downwardly through the conductors is of the order of 10–60 thousandths of an inch. The relationship of gap size to appropriate heating effect, can be important. For example, if there is no gap at the point where the hot air blast is directed, then only the upper surface of the conductors is heated, and this is not at the location where heating is important to achieve in order to effect a satisfactory weld. On the other hand, if the gap becomes too great, then the heating tends to become less localized and in fact, the effects of the heating are dissipated so that there is not an adequate intensity of heat at the proper location.

What is needed therefor is a gradual convergence of the conductors so that they are in the order of 10–60 thousandths of an inch apart at the time of receiving the hot air blast, this being merely a statement of usable ranges without intending to be bound by any particular range of gap size, and it being further understood that the size of the gap is determined in part by the size of the conductors. For example, if the conductor size is small, then the gap size is made correspondingly smaller, and similarly with larger size conductors, the gap size is likewise increased. These are considerations well within the skill of the art to establish, there being used the general principles disclosed herein and bearing in mind the particular conductor size, temperature and composition of the resin coating.

OPERATION

In operation, a plurality of strands of conductor are drawn continuously from supply reels 10, 12 and 14, and passed through straightening rollers 26, 28, where they are straightened and after being rectilinear, can be brought into continuous adjacent relationship to each other. After passing through locating rollers 32, 34, which bring the conductors into coplanar relation, the conductors are then strung through a chamber with converging sides and an upwardly inclined base, there being continuously passed into the chamber a heated blast of air which enters through opening 50, and is directed transversely to the direction of movement of the conductors. The conductors, which are spaced apart mutually from each other by slight gaps, receive a heated flow of hot gases through the gaps, and the peripheries of the conductors are heated at localized points as indicated by the intensity of the flow in FIG. 4.

Thus, the confronting tangential surfaces of the conductors are heated to a considerable extent and by amount sufficient to produce a tacky weldable condition of the resin insultaion. The hot gases, after passing through the gap are then directed in countercurrent flow to the conductors, exiting through opening 46 and in so doing, preheat the entirety of the conductors. Thus, the rate of movement of the conductors linearly through the chamber can be increased because by the time the conductors reach initial exposure to the hot gases, the conductor wires are already heated up to an extent so that the critical portion of the periphery of the conductor can quickly attain weldable temperatures. The conductors are then brought into tangential relationship by spacers 54, 56 which produce a slight, but nevertheless, effective contact which produces a linear weld between adjoining conductors, thereby welding the conductors together into a cable of a cross section which is indicated in FIG. 5.

After passing over the flat surface 57, they are then passed under a leveling bar 58 and onto a windup spool 60.

The rate of production of the cable is continuous and high speed, the linear speed being in the order 8–65 feet per minute.

The process is usable for joining different size conductors, and conductors of different insulation composition so long as they can form weldable connections therebetween. Also, the conductors may be of a different color and configuration, as well as different size and the thickness of the insulation cover can also vary.

Since the conductors at the time they are welded together are rectilinear and have been heated at weldable temperature, only at localized points, they are less likely to deform and to form irregularities on the surface, and also to have shorts occur within the cable because of overheating and melting to produce runoff of portion of the insulation.

It should be understood that the present invention also comprehends not only a hot air blast developed by a nozzle, but also one in which heating can be generated by other equivalent convection current heating devices.

CONCLUSION

Although the present invention has been illustrtaed and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

The embodiments of the invention in which an exclusive property or privilege is claimed are defined as follows:

1. A process for edge bonding elongated circular cross section conductors having resin composition exterior surfaces to form a plurality of such conductors into multiconductors, comprising the steps of: continuously directing a plurality of straightened continuous length resin coated conductors along converging paths, passing a heated flow of gases transversely to the direction of movement of said conductors, and encompassing the entire width of the combined diameters of said conductors and effecting a concentrated flow of such gases by directing the flow of such gases to strike and be channeled by the curved surfaces of said conductors through the narrow gaps, separating adjacent ones of said converging conductors to effect a tacky weldable condition of the confronting, tangential surfaces of said conductors which are held in spaced relation to each other, bringing the converging conductors together to produce a linear tangency of the confronting heated surfaces while they are weldable from said localized heating to join such tangent surfaces together and thereby form a multiplicity of connected ones of said conductors whose cross section is substantially unaltered by such joining.

2. The process in accordance with claim 1 including the step of preheating the resin-insulated conductors as they converge and prior to effecting maximum heating at their confronting contiguous surfaces which are joined by tangential welded surfaces therebetween.

3. The process in accordance with claim 2 including the step of continuously heating a flow of air which is generated as the heated flow of gases directed transversely to the movement of said conductors.

4. The process in accordance with claim 1 including the step of intensifying the heating of said resin exteriors at the zones of confronting surfaces which are tangentially joined.

5. The process in accordance with claim 1 including the step of straightening the individual conductors preliminary to joining said conductors together.

6. The process in accordance with claim 1 including the step of leveling said conductors to bring them into coplanar relation prior to joining such members together.

7. The process in accordance with claim 1 including the step of coiling the welded conductors in their welded relation.

8. Apparatus for welding multiple conductors comprising: means for supplying a plurality of circular cross section conductors having resin composition insulation outer layer, means for generatng a charge of heated gases encompassing the entire width of the combined diameter of said conductors, means for directing the flow of such gases to strike and be channeled by the curved surfaces of said conductors through narrow gaps separating adjacent ones of said conductors, means for progressively directing said conductors into intersecting relationship as they are heated to a temperature which is localized in the most intense heating effect to the confronting surfaces, and means for drawing said conductors together to effect a tangential contact between adjacent ones of said conductors which are brought together while still heated sufficiently to be weldable and which are thereby welded together at their point of contact to form a substantially linear seam of weld extending continuously between adjacented welded conductors.

9. The apparatus in accordance with claim 8 including means for conveying said conductors at a controlled rate whereby said conductors are brought into close proximity at the time of heating and are then brought tangentially together before cooling below weldable temperatures.

References Cited

UNITED STATES PATENTS

| 2,749,261 | 6/1956 | Hardison | 156—47 |
| 2,828,234 | 3/1958 | Hengel et al. | 156—47 |
| 3,005,739 | 10/1961 | Lang et al. | 156—47 |
| 3,077,428 | 2/1963 | Heuser et al. | 156—497X |
| 3,226,278 | 12/1965 | Scofield, Sr. et al. | 156—47X |
| 3,316,134 | 4/1967 | Durakis et al. | 156—47 |
| 3,322,584 | 5/1967 | Welin-Berger | 156—497X |

CARL D. QUARFORTH, Primary Examiner

H. E. BEHREND, Assistant Examiner

U.S. Cl. X.R.

156—82, 296, 497; 174—113